US010672273B2

(12) United States Patent
Minemura et al.

(10) Patent No.: US 10,672,273 B2
(45) Date of Patent: Jun. 2, 2020

(54) VEHICLE CONTROL METHOD AND APPARATUS (71) Applicant: DENSO CORPORATION, Kariya, Aichi-pref. (JP)

(72) Inventors: Akitoshi Minemura, Kariya (JP); Yosuke Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 147 days.

(21) Appl. No.: 15/574,426

(22) PCT Filed: May 18, 2016

(86) PCT No.: PCT/JP2016/064704
§ 371 (c)(1),
(2) Date: Nov. 15, 2017

(87) PCT Pub. No.: WO2016/186124
PCT Pub. Date: Nov. 24, 2016

(65) Prior Publication Data
US 2018/0144633 A1 May 24, 2018

(30) Foreign Application Priority Data
May 18, 2015 (JP) ................. 2015-101310

(51) Int. Cl.
B60R 21/0134 (2006.01)
B60T 7/22 (2006.01)
G08G 1/16 (2006.01)

(52) U.S. Cl.
CPC ........... G08G 1/16 (2013.01); B60R 21/0134 (2013.01); B60T 7/22 (2013.01); G08G 1/165 (2013.01);
(Continued)

(58) Field of Classification Search
CPC .......... G08G 1/16; G08G 1/165; G08G 1/166; B60T 7/22; B60T 2201/022; B60R 21/0134
See application file for complete search history.

(56) References Cited

U.S. PATENT DOCUMENTS

2011/0125372 A1   5/2011  Ito
2017/0210360 A1   7/2017  Ito et al.

FOREIGN PATENT DOCUMENTS

JP   2011-105250 A   6/2011
JP    5565017 A      8/2014
(Continued)

OTHER PUBLICATIONS

Chinese Master's Theses, Research on Vehicle Active Safety Forewarning System Based on Double CCD Camera Technology, dated Dec. 16, 2019, in 11 pages.

Primary Examiner — Tuan C To
Assistant Examiner — Kelly D Williams
(74) Attorney, Agent, or Firm — Knobbe, Martens, Olson & Bear, LLP (57) ABSTRACT When it is determined by an acceleration condition determiner that an own vehicle is accelerating, a collision prediction time calculator calculates a collision prediction time in accordance with a relative speed and a relative distance, and a timing setter sets an activation timing to a reference timing. When it is determined by the acceleration condition determiner that the own vehicle is not accelerating, and by a preceding object determiner that an object is not a preceding object, the collision prediction time calculator calculates the collision prediction time in accordance with the relative speed, a relative acceleration, and the relative distance, and the timing setter is configured to set the activation timing to be larger than the reference timing.

5 Claims, 2 Drawing Sheets (52) U.S. Cl.
CPC ........ *G08G 1/166* (2013.01); *B60T 2201/022* (2013.01)

(56) References Cited

FOREIGN PATENT DOCUMENTS

| | | |
|---|---|---|
| JP | 2016-034780 A | 3/2016 |
| WO | 2014-162941 A1 | 10/2014 |

VEHICLE CONTROL METHOD AND APPARATUS

TECHNICAL FIELD

The present invention relates to vehicle control methods and apparatuses for activating a safety device provided in an own vehicle if there is a high collision probability between the own vehicle and an object located in a travelling direction of the own vehicle.

BACKGROUND ART

Pre-crash safety (PCS) systems are known; these PCS systems mitigate and/or avoid collision damage between an own vehicle and objects, i.e. obstacles, such as other vehicles, pedestrians, or road structures located in the travelling direction of the own vehicle. Such a PCS system obtains a time to collision (TTC) with an object based on a relative distance of the obstacle with respect to the own vehicle and a relative speed or a relative acceleration of the obstacle relative to the own vehicle. The TTC represents a margin time until which the own vehicle would collide with the obstacle. Then, the PCS system causes a warning device to provide, to the driver of the own vehicle, a warning about the approach of the obstacle, and/or activates a braking device of the own vehicle.

As an example of such a PCS system, there is a vehicle control apparatus disclosed in patent document 1. The vehicle control apparatus disclosed in patent document 1 delays an activation timing of a warning device when the deceleration of the own vehicle is equal to or more than a threshold to correspondingly reduce unnecessary activation of the warning device.

CITATION LIST

Patent Literature

Japanese Patent Publication No. 5565017

SUMMARY

Technical Problem

If the speed of a preceding object, which is moving ahead of the own vehicle in the same direction of the own vehicle, rapidly decreases, the acceleration of the preceding object in its deceleration direction, i.e. the deceleration of the preceding object, may be more than the acceleration of the own vehicle in its deceleration direction, i.e. the deceleration of the own vehicle even in the case of deceleration of the own vehicle. This case may result in the relative speed between the own vehicle and the preceding vehicle increasing in the direction in which the own vehicle and the preceding vehicle approach each other.

Delaying the activation timing of the warning device by the vehicle control apparatus disclosed in patent document 1 in this case may cause the safety device not to be activated although the safety device has to be activated, resulting in deactivation of the safety device.

On the other hand, activating a safety device although a driver is performing an operation to avoid a collision may cause the safety device to be activated although the safety device should not be activated, resulting in unnecessary activation of the safety device.

For solving such a problem, an aspect of the present invention mainly seeks to provide vehicle control methods and apparatuses for balancing reduction in deactivation of a safety device and reduction in unnecessary activation of the safety device.

Solution to Problem

A first aspect of the present invention is a vehicle control apparatus for activating, as a safety device, a device to mitigate collision damage or avoid collision between an own vehicle and an object located ahead in a travelling direction of the own vehicle in accordance with a probability of the own vehicle and the object. The vehicle control apparatus includes an obtainer configured to obtain a relative distance between the own vehicle and the object, a relative speed between the own vehicle and the object, and a relative acceleration between the own vehicle and the object, and an acceleration condition determiner configured to determine whether the own vehicle is accelerating. The vehicle control apparatus includes a preceding object determiner configured to determine whether the object is a preceding object moving in the same direction of the own vehicle, and a collision prediction time calculator configured to calculate a collision prediction time that represents a time until which the own vehicle is predicted to collide with the object. The vehicle control apparatus includes a timing setter configured to set an activation timing to be compared with the collision prediction time for determining whether to activate the safety device. When it is determined by the acceleration condition determiner that the own vehicle is accelerating, the collision prediction time calculator is configured to calculate the collision prediction time in accordance with the relative speed and the relative distance, and the timing setter is configured to set the activation timing to a reference timing. When it is determined by the acceleration condition determiner that the own vehicle is not accelerating, and by the preceding object determiner that the object is not a preceding object, the collision prediction time calculator is configured to calculate the collision prediction time in accordance with the relative speed, the relative acceleration, and the relative distance, and the timing setter is configured to set the activation timing to be larger than the reference timing.

A second aspect of the present invention is a vehicle control method of activating, as a safety device, a device to mitigate collision damage or avoid collision between an own vehicle and an object located ahead in a travelling direction of the own vehicle in accordance with a probability of the own vehicle and the object. The vehicle control method includes an obtaining step of obtaining a relative distance between the own vehicle and the object, a relative speed between the own vehicle and the object, and a relative acceleration between the own vehicle and the object, and an acceleration condition determining step of determining whether the own vehicle is accelerating. The vehicle control method includes a preceding object determining step of determining whether the object is a preceding object moving in the same direction of the own vehicle, and a calculating step of calculating a collision prediction time that represents a time until which the own vehicle is predicted to collide with the object. The vehicle control method includes a timing setting step of setting an activation timing to be compared with the collision prediction time for determining whether to activate the safety device. When it is determined by the acceleration condition determining step that the own vehicle is accelerating, the calculating step is configured to calculate the collision prediction time in accordance with the relative speed and the relative distance, and the timing setting step is configured to set the activation timing to a reference timing. When it is determined by the acceleration condition determining step that the own vehicle is not accelerating, and by the preceding object determining step that the object is not a preceding object, the calculating step is configured to calculate the collision prediction time in accordance with the relative speed, the relative acceleration, and the relative distance, and the timing setting step is configured to set the activation timing to be larger than the reference timing.

If an object is a preceding object, a driver is likely to recognize a deceleration of the object and determine that it is necessary to avoid collision when the own vehicle is not accelerating. In this case, if the relative speed between the own vehicle and the object increases in the approaching direction due to, for example, rapid deceleration of the object or delay of a driver's brake operation, the collision prediction time, which is calculated based on the relative speed between the own vehicle and the object, is later than an actual collision time between the own vehicle and the object.

From this viewpoint, when the own vehicle is not accelerating and the object is not a preceding object, each of the first and second aspects is configured to calculate the collision prediction time in accordance with the relative speed, the relative acceleration, and the relative distance, and set the activation timing to be larger than the reference timing. This enables the collision prediction time to be closer to the actual collision time and the safety device to be activated earlier in a situation where a driver's deceleration operation intends to avoid a risk of collision due to rapid deceleration of the preceding object.

In addition, if the own vehicle is accelerating, a driver is likely to determine that it is unnecessary to avoid an object independently of whether the object is a preceding object. In this case, if the collision prediction time were calculated based on the relative acceleration or the activation timing were set to be larger, the safety device would be likely to be unnecessarily activated.

From this viewpoint, when the own vehicle is accelerating, each of the first and second aspects is configured to calculate the collision prediction time in accordance with the relative speed, and set the activation timing to the reference timing. This prevents the collision prediction time from being calculated to be smaller more than is needed, and also prevents a value of the activation timing from being set to be larger than is needed. This therefore results in reduction of unnecessary activation of the safety device.

That is, the above configuration is to

1. Make the calculation method of the collision prediction time for the case where the own vehicle is accelerating different from the calculation method of the collision prediction time for the case where the own vehicle is not accelerating 2. Make a value of the activation timing for the case where the own vehicle is accelerating different from a venue of the activation timing for the case where the own vehicle is not accelerating This therefore balances preventing deactivation of the safety device and preventing unnecessary activation of the safety device.

DESCRIPTION OF THE EMBODIMENTS

The following describes embodiments of the present disclosure with reference to the accompanying drawings. In the embodiments, like reference characters are assigned to like or identical parts between the embodiments, so that the descriptions for one of the like or identical parts are applied to another of the like or identical parts.

First Embodiment

A vehicle control apparatus according to the first embodiment is installed in an own vehicle 40. The vehicle control apparatus serves as a PCS system that 1. Determines whether an object is located in the travelling direction of the own vehicle 40, i.e. in the forward direction of the own vehicle 40

2. Performs control to avoid collision between the object and the own vehicle 40 and/or mitigate damage due to collision therebetween upon determination that the object is located in the travelling direction of the own vehicle 40

Figure 1:
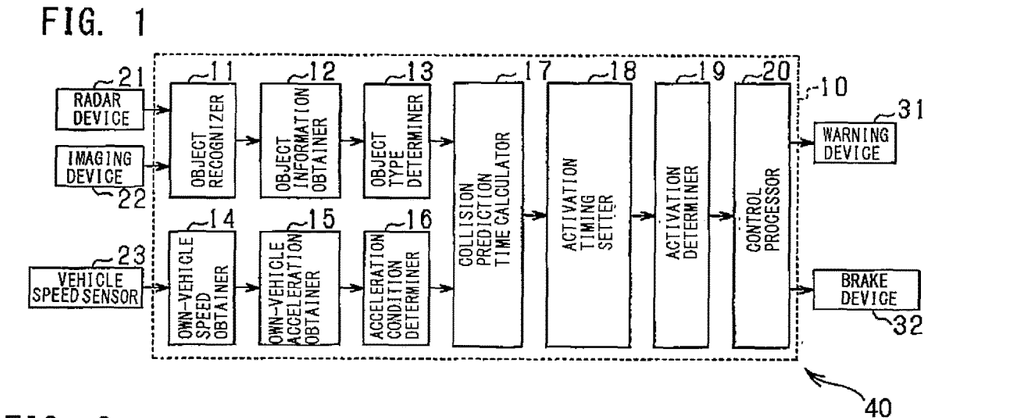
FIG. 1 is a structural diagram of a vehicle control apparatus according to the first embodiment of the present invention.

Referring to FIG. 1, a cruise-assist ECU 10, which serves as a vehicle control apparatus, includes a computer that is comprised of a CPU, a memory including a ROM and a RAM, and an I/O unit. The CPU of the cruise-assist ECU 10 runs programs installed in, for example, the ROM to implement various functions described later.

A radar device 21, an imaging device 22, and a vehicle speed sensor 23 are connected to the cruise-assist ECU 10 as sensor devices for inputting various pieces of detected information to the cruise-assist ECU 10.

For example, the radar device 21 is an available millimeter radar transmitting a high-frequency signal within a millimeter wave range as its transmission waves, and is mounted at, for example, the center of the front end of the own vehicle 40. The radar device 21 has a center axis extending, from the center of the front end of the own vehicle 40, in the travelling direction of the own vehicle 40. The radar device 21 has a predetermined detection range that has a predetermined view angle, such as a detection angle, or scanning angle, and extends in the right and left direction around the center axis. That is, the radar device 21 is capable of detecting the position of an object within the detection range.

Specifically, the radar device 21 transmits probe waves to the detection range through a transmitting antenna in a predetermined period, and receives reflected waves, i.e. echoes, based on reflection of the transmitted radar waves by an object through respective receiving antennas. The radar device 21 calculates the distance of the object from the own vehicle 40 based on the transmission time of the prove waves and the reception times of the respective reflected waves.

The radar device 21 also calculates the relative speed of the object relative to the own vehicle 40 based on the frequencies of the reflection waves based on reflection of the transmitted radar wave by the object; the frequencies have been changed based on Doppler effect.

In addition, the radar device 21 calculates the azimuth of the object based on the differences in phase between the reflection waves received by the respective receiving antennas.

Note that the radar device 21 is capable of identifying the relative position of the object relative to the own vehicle 40 based on the calculated position and azimuth of the object. Note that the radar device 21 performs, in the predetermined period, referred to as a first period, a task of 1. Transmitting the radar wave
2. Receiving the reflection waves based on reflection of the transmitted radar wave
3. Calculating the reflection position, i.e. the relative position of an object and the own vehicle 40, and the relative speed of the object relative to the own vehicle 40 in accordance with the received reflection waves Then, the radar device 21 sends the reflection position and the relative speed of the object to the cruise-assist ECU 10 as first detection information. Note that objects detected by the radar device 21 will be referred to as radar-based objects.

The imaging device 22 is designed as a monocular imaging device, such as a CCD camera device, a CMOS image sensor device, or a near-infrared camera device. For example, the imaging device 22 is mounted to the center of the own vehicle 40 in the vehicle width direction at a predetermined height, and has an optical axis extending in front of the own vehicle 40. The imaging device 22 has a region, i.e. an imaging range, that horizontally extends around the optical axis within a predetermined angular range, i.e. a predetermined angle of view. The imaging device 22 captures, from the predetermined height, i.e. from a higher point of view, images of the region, i.e. the imaging range.

The imaging device 22 extracts, from a captured image, i.e. a frame image, feature points each indicative of the existence of an object. Specifically, the imaging device 22 extracts edge points from the captured image based on light-intensity information included in the captured image. Then, the imaging device 22 performs Hough transform of the extracted edge points. The Hough transform is capable of extracting, as feature points, points on a straight line on which some of the edge points are aligned, and/or points at which straight lines intersect. Note that the imaging device 22 performs, in a second period different from the first period of the radar device 21, a task of 1. Capturing a frame image
2. Extracting feature points for an object The imaging device 22 sends, to the cruise-assist ECU 10, the results of extracting the feature points as second detection information for the object as second detection information. Objects detected by the imaging device 22 will be referred to as image-based objects.

The vehicle speed sensor 23 is mounted to the rotary shaft that transfers torque to the driving wheels of the own vehicle 40, and is operative to obtain the speed of the own vehicle 40 based on the number of turns of the rotary axis.

The own vehicle 40 includes a warning device 31 and a brake device 32 as its safety devices that are driven in response to control instructions sent from the cruise-assist ECU 10.

The warning device 31 includes a speaker and/or a display mounted in the compartment of the own vehicle 40. The warning device 31 is configured to output warnings including, for example, warning sounds and/or warning messages to inform the driver of a risk of collision in response to a control instruction sent from the cruise-assist ECU 10 when the cruise-assist ECU 10 determines that there is high risk of collision of the own vehicle 40 with an object.

The brake device 32 is configured to brake the own vehicle 40. The brake device 32 is activated in response to a control instruction sent from the cruise-assist ECU 10 when the cruise-assist ECU 10 determines that there is a high risk of collision of the own vehicle 40 with an object. Specifically, the brake device 32 performs a brake-assist function of increasing braking force, which is based on the driver's brake operation, to the own vehicle 40, or an automatic brake function of automatically braking the own vehicle 40 if there is no braking operation by the driver.

The cruise-assist ECU 10 functionally includes an object recognizer 11, an object information obtainer 12, an object type determiner 13, an own-vehicle speed obtainer 14, and an own-vehicle acceleration obtainer 15. The cruise-assist. ECU 10 also functionally includes an acceleration condition determiner 16, a collision prediction time calculator 17, an activation timing setter 18, an activation determiner 19, and a control processor 20.

The object recognizer 11 periodically obtains the first detection information from the radar device 21, and periodically obtains the second detection information from the imaging device 22.

The object recognizer 11 obtains first position information for each radar-based object based on the position of the corresponding radar-based object, i.e. the reflection position of the corresponding radar-based object, and second position information for each image-based object based on the feature points corresponding to the image-based object. Then, the object recognizer 11 determines that a radar-based object and an image-based object are the same object when the corresponding first position information is close to the corresponding second position information. Next, the object recognizer 11 matches the corresponding first position information with the corresponding second position information.

Specifically, if the second position information about an image-based object is located to be close to the first position information about a radar-based object, there is a high probability of a corresponding actual object being located at the position based on the first position information. The state where the first position information about each radar-based object is identical to or close to the second position information about the corresponding image-based object will be referred to as a fusion state. In other words, the fusion state shows that the radar device 21 and the imaging device 22 are each capable of obtaining the position of an object with high accuracy.

The object recognizer 11 periodically performs an object recognizing task that includes 1. Obtaining the first detection information for each radar-based object
2. Obtaining the second detection information for each image-based object
3. Obtaining the fusion information about each object detected in the fusion state The object recognizer 11 stores, for each period, the position information about each radar-based object, the position information about each image-based object, and the position information about each object, i.e. each fusion-based object, detected in the fusion state into the memory as a detection history. The fusion information can include identification information.

The position information in each of the first detection information, the second detection information, and the fusion information obtained from an object includes at least 1. A position, i.e. a longitudinal position, of the detected shape of the object in the travelling direction, i.e. the longitudinal direction, of the own vehicle 40

2. A position, i.e. a lateral position, of the detected shape of the object in the direction perpendicular to the travelling direction, i.e. the lateral direction, of the own vehicle 40

For a fusion-based object, the object recognizer 11 refers to the detection history in accordance with identification information about the fusion-based information for each period to correspondingly determine whether the fusion-based object has been continuously in the fusion state. The object recognizer 11 determines that the fusion-based object is located at the corresponding position, i.e. the first position based on the detection result by the radar device 21, upon determination that the fusion-based object has been continuously in the fusion state. In addition, when it is determined that the fusion-based object has not been detected in a period, the object recognizer 11 refers to the detection history for the fusion-based object, and assumes that the fusion-based object was at the previous position, i.e. the position detected in the previous period.

Additionally, the object recognizer 11 performs pattern matching of the second detection information of a fusion-based object with feature patterns of many objects including vehicles, pedestrians, and roadside objects. Then, the object recognizer 11 determines, based on the result of the pattern matching, whether the fusion-based object is a vehicle or a pedestrian. Then, the object recognizer 11 causes the determined type, i.e. a vehicle or a pedestrian, of the fusion-based object to correlate with the corresponding fusion-based object. Note that the type of pedestrians can include persons who ride bicycles.

Next, the object information obtainer 12 causes, for each object recognized by the object recognizer 11, the corresponding relative position and relative speed to correlate with one another. The relative position includes a lateral distance that is the relative position of the object relative to the own vehicle 40 in a direction perpendicular to the travelling direction of the own vehicle 40, and a longitudinal distance that is the relative position of the object relative to the own vehicle 40 in the travelling direction of the own vehicle 40.

Then, the object information obtainer 12 calculates, based on the corresponding relative position and relative speed for each object, a lateral speed and a longitudinal speed. The lateral speed represents a relative speed in a direction perpendicular to the travelling direction of the own vehicle 40, and the longitudinal speed represents a relative speed in the travelling direction of the own vehicle 40.

In addition, the object information obtainer 12 differentiates the longitudinal speed of each object over time to correspondingly calculate a relative acceleration of the corresponding object relative to the own vehicle 40 in the travelling direction of the own vehicle 40. Note that, if we use the word "relative distance" without distinguishing the relative distance between the longitudinal distance and the lateral distance, the word "relative distance" shows the longitudinal distance. Similarly, if we use the word "relative speed" without distinguishing the relative speed between the longitudinal speed and the lateral speed, the word "relative speed" shows the longitudinal speed.

The object type determiner 13, which serves as, for example, a preceding object determiner, classifies the type of each object recognized by the object recognized 11 in accordance with the type of the corresponding object, the lateral speed, and the longitudinal speed.

If a recognized object is a vehicle, the object type determiner 13 classifies, based on the longitudinal speed of the recognized object and the speed of the own vehicle 40, the vehicle into any one of 1. A preceding vehicle travelling in the same direction as the forward travelling direction of the own vehicle 40 ahead of the own vehicle 40

2. An oncoming vehicle travelling in an oncoming lane ahead of the own vehicle 40 in the travelling direction 3. A stopped vehicle stopped ahead of the own vehicle 40 in the travelling direction If a recognized object is a pedestrian, the object type determiner 13 classifies, based on the longitudinal speed of the recognized object and the speed of the own vehicle 40, the pedestrian into any one of 1. A preceding pedestrian walking in the same direction as the travelling direction of the own vehicle 40 ahead of the own vehicle 40

2. An oncoming pedestrian walking in the opposite direction of the travelling direction of the own vehicle ahead of the own vehicle 40

3. A stopped pedestrian stopped ahead of the own vehicle 40 in the travelling direction 4. A crossing pedestrian crossing ahead of the own vehicle 40 in the travelling direction In addition, for a radar-based object detected based on only the first detection information, the object type determiner 13 classifies, based on the longitudinal speed and the speed of the own vehicle 40, the radar-based object into any one of 1. A preceding object moving in the same direction as the travelling direction of the own vehicle 40 ahead of the own vehicle 40

2. An oncoming object moving in the direction opposite to the travelling direction of the own vehicle 40 ahead of the own vehicle 40 in the travelling direction 3. A stopped object stopped ahead of the own vehicle 40 in the travelling direction Hereinafter, preceding vehicles, preceding pedestrians, and preceding objects in the objects will be collectively referred to as preceding objects, and oncoming vehicles, oncoming pedestrians, and oncoming objects will be collectively referred to as oncoming objects. In addition, stopped vehicles, stopped pedestrians, and stopped objects will be collectively referred to as stopped objects.

The own-vehicle speed obtainer 14 obtains the speed of the own vehicle 40 detected by the vehicle speed sensor 23 as an own-vehicle speed. Vs.

The own-vehicle acceleration obtainer 15 differentiates the own-vehicle speed Vs over time to correspondingly calculate an own-vehicle acceleration $\alpha$s that is an acceleration of the own vehicle 40.

The acceleration condition determiner 16 determines whether the own vehicle 40 is accelerating in accordance with the own-vehicle acceleration $\alpha$s obtained from the own-vehicle acceleration obtainer 15. The acceleration condition determiner 16 can determine that the own vehicle 40 is accelerating upon determining that the own-vehicle acceleration $\alpha$s increases the own-vehicle speed Vs ahead of the own vehicle 40 in the travelling direction of the own vehicle 40.

The collision prediction time calculator 17 calculates a collision prediction time, which represents a duration until which a relative distance Y between the own vehicle 40 and a recognized object would become zero, that is, a margin time until which the own vehicle 40 is predicted to collide with a recognized object. In other words, the collision prediction time represents a period until which the own vehicle 40 is predicted to collide with a recognized object.

The collision prediction time can be calculated in accordance with any one of the following first to third calculation methods.

The first calculation method uses the relative speed, referred to as Vr, and the relative distance Y between the own vehicle 40 and a recognized object to an equation of uniform linear motion to correspondingly calculate, as the collision prediction time, a tune to collision (TTC) in accordance with the following equation (1):

$$TTC = Y/Vr \quad (1)$$

Note that the relative speed Vr is positive when the own vehicle 40 and the recognized object approach each other.

The second calculation method uses the relative speed Vr, the relative acceleration, referred to as αr, and the relative distance Y between the own vehicle 40 and a recognized object to an equation of linear motion with constant acceleration to correspondingly calculate, as the collision prediction time, an enhanced time to collision-relative acceleration (ETTCref) in accordance with the following equation (2):

$$ETTCref = \frac{-Vr + \sqrt{Vr^2 + 2\alpha r \cdot Y}}{\alpha r} \quad (2)$$

Note that the relative acceleration αr is positive when the relative speed Vr increases in the positive direction.

The third calculation method uses the relative speed Vr between the own vehicle 40 and a recognized object, the own-vehicle acceleration αs, and the relative distance Y between the own vehicle 40 and the recognized object to correspondingly calculate, as the collision prediction time, an enhanced time to collision-self acceleration (ETTCslf) in accordance with the following equation (3):

$$ETTCslf = \frac{-Vr + \sqrt{Vr^2 + 2\alpha s \cdot Y}}{\alpha s} \quad (3)$$

Note that the own-vehicle acceleration αs is positive when the own-vehicle speed Vs increases ahead of the own vehicle 40 in the travelling direction of the own vehicle 40.

The collision prediction time calculator 17 determines calculation of any one of the collision prediction time TTC, the collision prediction time ETTCrel, and the collision prediction time ETTCslf in accordance with the type of a recognized object identified by the object type determiner 13 and the acceleration condition of the own vehicle 40 obtained by the acceleration condition determiner 16.

For example, in a case where the recognized object is a preceding object, the preceding object is likely to rapidly decrease the speed. For the case, if the TTC is calculated as the collision prediction time, the collision prediction time may be calculated to be larger than an actual time until which the own vehicle 40 collides with the preceding vehicle. This may result in activation of the safety devices being delayed. For the case, therefore, the collision prediction time calculator 17 calculates the ETTCrel as the collision prediction time.

The activation timing setter 18 sets the activation timing for each safety device. The activation timing represents a duration until which activation is started. The activation period is compared with each of the collision prediction times TTC, ETTCrel, and ETTCslf. Specifically, if each of the collision prediction times TTC, ETTCrel, and ETTCslf becomes equal to or lower than the activation timing of a safety device, the safety device is configured to be activated. The larger the activation timing for a safety device is, the earlier the safety device is activated even if the corresponding collision prediction time is large.

Different values of the activation timing are set for the respective functions of the safety devices.

Specifically, the activation timing for the warning device 31 is set to be the largest. This is because, if the driver notices a possibility of collision of the own vehicle 40 to depress a brake pedal, the brake device 32 is activated to brake the own vehicle 40, making it possible to avoid this collision without the cruise-assist ECU 10 outputting the control instruction to the brake device 32.

As values of the activation timing for the brake device 32, the values of the activation timing are individually determined for the brake-assist function and the automatic brake function. These values of the activation timing can be set to be equal to each other or different from each other.

In addition, the activation timing setter 18 sets the activation timing to any one of a reference timing, a first timing larger than the reference timing, and a second timing smaller than the reference timing.

If the activation timing is set to the first timing, the collision prediction time reaches the activation timing earlier even if there is a large distance between the own vehicle 40 and a recognized object.

In contrast, if the activation timing is set to the second timing, the collision prediction time reaches the activation timing later even if there is a small distance between the own vehicle 40 and a recognized object.

The activation determiner 19 compares the collision prediction timing with the values of the activation timing for the respective functions of the safety devices. If the collision prediction time is equal to or lower than the value of one of the functions of the safety devices, the activation determiner 19 sends a control instruction to the control processor 20. Then, the control processor 20 serves as a safety device activating unit to cause the corresponding safety device to perform the corresponding function.

Figure 2:
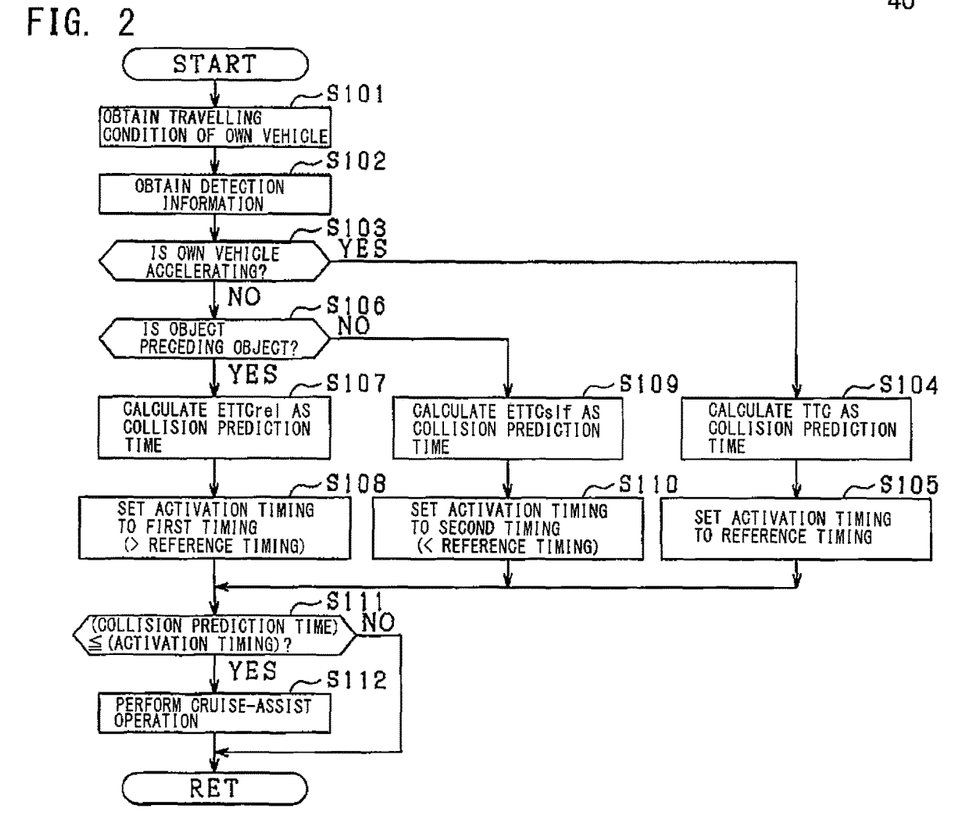
FIG. 2 is a flowchart illustrating a cruise-assist routine carried out by the vehicle control apparatus according to the first embodiment.

Next, the following describes a routine carried out by the cruise-assist ECU 10 with reference to the flowchart of FIG. 2.

The routine, referred to as a cruise-assist routine, based on the flowchart of FIG. 2 is carried out by the cruise-assist ECU 10 in a predetermined control period for each function of the safety devices and for each recognized object. The control period can be set to be equal to or different from a control period for each of the radar device 21 and the imaging device 22.

First, the cruise-assist ECU 10 obtains, based on the measurement information from, for example, the vehicle speed sensor 23, the travelling conditions of the own vehicle 40, which include, for example, the own-vehicle speed Vs and the own-vehicle acceleration αs in step S101. For example, the operation in step S101 is carried out by the own-vehicle speed obtainer 14 and the own-vehicle acceleration obtainer 15.

In addition, the cruise-assist ECU 10 obtains the first detection information from the radar device 21, and obtains the second detection information from the imaging device 22 in step S102. Then, the cruise-assist ECU 10 recognizes objects ahead of the own vehicle 40 in the travelling direction of the own vehicle 40 in accordance with the obtained first detection information and second detection information in step S102. In step S102, the cruise-assist ECU 10 obtains information about each of the recognized objects, which includes the relative position, relative speed, and relative acceleration relative to the own vehicle 40, to correspondingly determine the type of the recognized object. The operations in step S102 are for example carried out by the object recognizer 11, object information obtainer 12, and the object type determiner 13. Hereinafter, there is a single object recognized by the cruise-assist ECU 10 for the sake of simplified description.

Next, the cruise-assist ECU 10 determines whether the own vehicle 40 is accelerating in accordance with the travelling conditions of the own vehicle 40 in step S103. The operation in step S103 is carried out by, for example, the acceleration condition determiner 16.

Upon determination that the own vehicle 40 is accelerating (YES in step S103), the cruise-assist ECU 10 calculates the TTC as the collision prediction time in step S104, and sets the activation timing to the reference timing in step S105. The operation in step S104 is carried out by, for example, the collision prediction time calculator 17, and the operation in step S105 is carried out by, for example, the activation timing setter 18.

Otherwise, upon determination that the own vehicle 40 is not accelerating (NO in step S103), the cruise-assist. ECU 10 determines, based on the first detection information and the second detection information, whether the recognized object is a preceding object in step S106. The operation in step S106 is carried out by, for example, the object type determiner 13.

Upon determination that the recognized object is a preceding vehicle (YES in step S106), the cruise-assist ECU 10 calculates the ETTCrel as the collision prediction time in step S107, and sets the activation timing to the first timing larger than the reference timing in step S108. Specifically, the cruise-assist ECU 10 sets the activation timing to the first timing to thereby cause the corresponding safety device to be activated earlier. The operation in step S107 is carried out by, for example, the collision prediction time calculator collision prediction time calculator 17, and the operation in step S108 is carried out by, for example, the activation timing setter 18.

Otherwise, upon determination that the recognized object is not a preceding vehicle (NO in step S106), that is, determination that the recognized object is a stopped object or an oncoming object, the cruise-assist ECU 10 calculates the ETTCslf as the collision prediction time in step S109, and sets the activation timing to the second timing smaller than the reference timing in step S110. Specifically, the cruise-assist ECU 10 sets the activation timing to the second timing to thereby cause the corresponding safety device to be activated later. The operation in step S109 is carried out by, for example, the collision prediction time calculator 17, and the operation in step S110 is carried out by, for example, the activation timing setter 18.

When the collision prediction time and the activation timing have been obtained, the cruise-assist ECU 10 compares the collision prediction time with the activation timing in step S111. Upon determination that the collision prediction time is equal to or smaller than the activation timing, that is, the collision prediction time has reached the activation timing (YES in step S111), the cruise-assist ECU 10 activates the corresponding safety device to perform cruise-assist operations in step S112.

Otherwise, upon determination that the collision prediction time is larger than the activation timing (NO in step S111), the cruise-assist ECU 10 terminates the routine, i.e. the cruise-assist routine. The operation in step S111 is carried out by, for example, the activation determiner 19, and the operation in step S112 is carried out by, for example, the control processor 20.

Note that, as described above, if there are objects recognized in step S102, the operations in steps S103 to S109 are carried out for each of the recognized objects, so that the collision prediction time is calculated for each of the recognized objects.

In addition, if there are safety devices, the operation in steps S103, the operation in step S108, or the operation in step S110 is carried out for each of the safety devices, so that the activation timing is set for each of the safety devices. This results in the collision prediction time calculated for each recognized object being compared with the activation timings set for the respective safety devices in step S111.

Note that, when calculating the collision prediction time ETTCslf in step S109, if the own-vehicle acceleration $\alpha s$ is zero or the calculated result contains an imaginary, the cruise-assist ECU 10 is configured to calculate the TTC as the collision prediction time. Similarly, when calculating collision prediction time ETTCrel in step S107, if the relative acceleration $\alpha r$ is zero or the calculated result contains an imaginary, the cruise-assist ECU 10 is configured to calculate the TTC as the collision prediction time.

In addition, when calculating the TTC in step S104, if the relative speed Vr is equal to or lower than zero, the cruise-assist ECU 10 is configured to determine that there is no probability of collision, thus causing the control processor 20 to maintain the corresponding safety device being deactivated.

These operations in the above two paragraphs are omitted from the flowchart of FIG. 2.

The cruise-assist ECU 10, i.e. the vehicle control apparatus, according to the first embodiment, which is configured set forth above, achieves the following advantageous effects.

If a recognized object is a preceding object and the own vehicle 40 is not accelerating, the vehicle control apparatus is configured to calculate, based on the relative speed Vr, the relative acceleration $\alpha r$, and the relative distance Y, the ETTCrel as the collision prediction time with respect to the recognized object. Then, the vehicle control apparatus is configured to set the activation timing of a corresponding safety device to the first timing larger than the reference timing.

This configuration enables the collision prediction time to approach a time at which the own vehicle 40 is predicted to actually collide with the preceding object in a situation where the driver of the own vehicle decelerates the own vehicle 40 to avoid a risk of collision due to rapid decrease of the speed of the preceding object. This configuration also enables the safety device to be activated earlier in the situation where the driver of the own vehicle decelerates the own vehicle 40 to avoid a risk of collision due to rapid decrease of the speed of the preceding object.

This therefore prevents deactivation of the safety device in a situation where there is a high risk of collision.

If the own vehicle 40 is accelerating, the driver of the own vehicle 40 is likely to determine that it is unnecessary for a driver of the own vehicle 40 to avoid a collision with a recognized object. In this case, if the collision prediction time were calculated based on the relative acceleration $\alpha r$ or the activation timing for a safety device were set to be large, the safety device would be likely to be unnecessary activated without the driver's intention being reflected.

From this viewpoint, if the own vehicle 40 is accelerating, the above configuration enables the vehicle control apparatus to calculate, based on the relative speed Vr and the relative distance the TTC as the collision prediction time with respect to the recognized object, and to set the activation timing for the safety device to the reference timing.

This prevents the collision prediction time from being calculated as a value more than necessary, and prevents the activation timing for the safety device from being set to a value more than requires. This therefore prevents unnecessary activation of the safety device.

If a recognized object is a stopped object or an oncoming object and the own vehicle 40 is not accelerating, there is a high probability of the driver, which has recognized a risk of collision, operating the own vehicle 40 to avoid a collision or being about to operate the own vehicle 40 to avoid a collision. In this case, if the activation timing for a safety device were set to the first timing larger than the reference timing, the safety device would be unnecessary activated.

From this viewpoint, if a recognized object is a stopped object or an oncoming object and the own vehicle 40 is not accelerating, the vehicle control apparatus according to the first embodiment sets the activation timing for a safety device to the second timing smaller than the reference timing. This prevents unnecessary activation of the safety device.

Second Embodiment

The overall structure of a vehicle control apparatus according to the second embodiment is substantially identical to the overall structure of the vehicle control apparatus according to the first embodiment. A part of the cruise-assist routine carried out by the cruise-assist ECU 10 according to the second embodiment is different from the corresponding cruise-assist routine of the cruise-assist ECU 10 according to the first embodiment.

Therefore, the following mainly describes the different points.

If the preceding object rapidly decelerates, it is necessary to activate a safety device earlier when the speed of the own vehicle 40 is higher than a predetermined value. Otherwise, even if the preceding object rapidly decelerates, a driver's brake operation likely avoids collision when the speed of the own vehicle 40 is lower than the predetermined value. In this case, if the collision prediction time were calculated as the ETTCrel, and the activation timing for a safety device were set to be larger than the reference timing, the safety device would be likely to be unnecessary activated.

From this viewpoint, a vehicle control apparatus according the second embodiment changes the calculation method of the collision prediction time if a recognized object is a preceding object and the own vehicle 40 is not accelerating.

Figure 3:
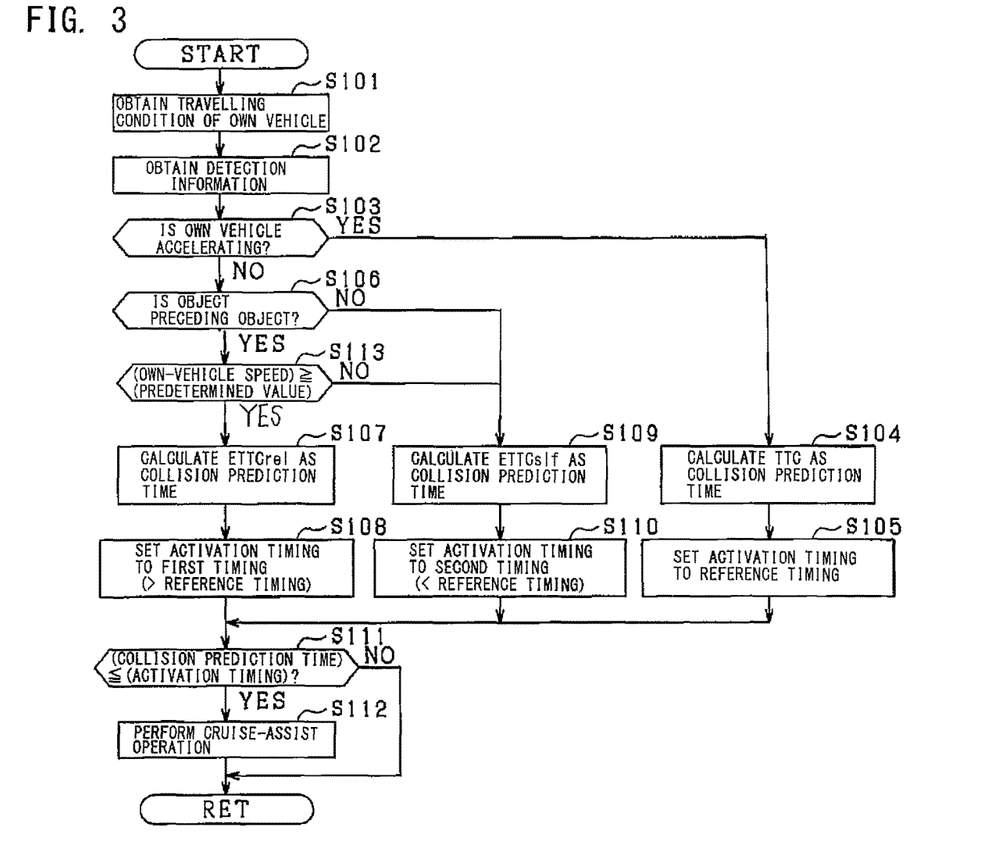
FIG. 3 is a flowchart illustrating a cruise-assist routine carried out by the vehicle control apparatus according to the second embodiment of the present invention.

FIG. 3 is a flowchart illustrating a cruise-assist routine carried out by a cruise-assist ECU 10 according to the second embodiment. Note that, in the cruise-assist routine illustrated in FIG. 3, operations identical to operations in the cruise-assist routine illustrated in FIG. 2, to which identical step numbers are assigned, are omitted in description.

Upon determination that the recognized object is a preceding vehicle (YES in step S106), the cruise-assist ECU 10 determines whether the own-vehicle speed Vs is equal to or higher than a predetermined value in step S113. Upon determination that the own vehicle speed Vs is equal to or higher than the predetermined value (YES in step S113), the cruise-assist ECU 10 calculates the ETTCrel as the collision prediction time in step S107. Otherwise, upon determination that the own-vehicle speed Vs is lower than the predetermined value (NO in step S113), the cruise-assist ECU 10 calculates the ETTCslf as the collision prediction time, which is similar to the case where the recognized object is not a preceding object in step S109.

The cruise-assist ECU 10 configured set forth above achieves the following advantageous effects.

If the own vehicle 40 is not accelerating and a recognized object is a preceding object, the collision prediction time calculator 17 of the cruise-assist ECU 10 for example calculates the collision prediction time based on the relative acceleration αr, and the activation timing setter 18 sets the activation timing to a value larger than the reference timing as long as the own-vehicle speed Vs is equal to or higher than the predetermined value. This prevents, if the speed of the own vehicle 40 is higher than the predetermined speed so that there is a high probability of delay a driver's collision avoidance operation, deactivation of the safety device in response to rapid deceleration of the preceding object.

If the own vehicle 40 is not accelerating and a recognized object is a preceding object, the collision prediction time calculator 17 of the cruise-assist ECU 10 for example calculates the collision prediction time based on the own-vehicle acceleration us, and the activation timing setter 18 sets the activation timing to a value smaller than the reference timing as long as the own-vehicle speed Vs is lower than the predetermined value. This prevents, if a driver's collision avoidance operation is likely to be carried out, unnecessary operation of the safety device.

Third Embodiment

The overall structure of a vehicle control apparatus according to the third embodiment is substantially identical to the overall structure of the vehicle control apparatus according to each of the first and second embodiments. A part of a cruise-assist ECU 10A according to the third embodiment is different from the cruise-assist ECU 10 according to each of the first and second embodiments.

Figure 4:
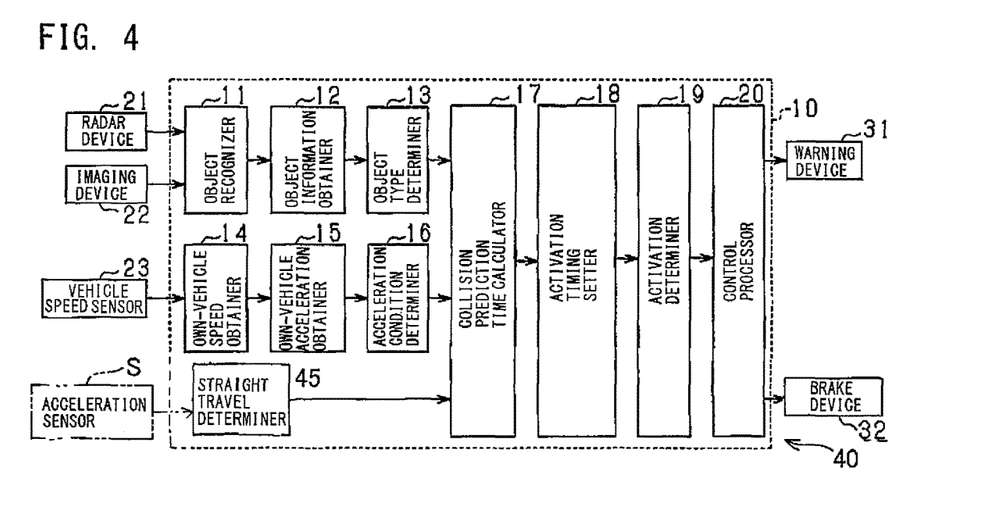
FIG. 4 is a structural diagram of a vehicle control apparatus according to the third embodiment of the present invention.

FIG. 4 is a structural diagram of the cruise-assist ECU 10A according to the third embodiment.

The cruise-assist ECU 10A further includes a straight travel determiner 45 for determining whether the own vehicle 40 is travelling straight. The straight travel determiner 45 extracts, from the image obtained from the imaging device 22, lane marking lines, such as white lines, painted on the road surface. The straight travel determiner 45 calculates the curvature of the lane marking lines to correspondingly determine whether the own vehicle 40 is travelling in a straight section of the road or in a curved section of the road.

When the own vehicle 10 is travelling in the curved section, there is a high probability of an object, which is present ahead of the own vehicle 40 in the travelling direction of the own vehicle 40, being not located on the travelling course of the own vehicle 40. In this case, activating the safety device to avoid collision with the object would result in the safety device being likely to be unnecessarily activated. From this viewpoint, a new condition that the own vehicle 40 is travelling straight is added to the condition for activating the safety device. That is, the safety device is activated if the collision prediction time reaches the activation timing under the condition that the own vehicle 40 is travelling straight.

Note that, if the own vehicle 40 is following a preceding vehicle, the straight travel determiner 45 can determine whether the own vehicle 40 is travelling straight in accordance with the travel trajectory of the preceding vehicle. In addition, if the own vehicle 40 is provided with an accelerator sensor S (see phantom line in FIG. 4), the straight travel determiner 45 can determine whether the own vehicle 40 is travelling straight using the acceleration sensor S. These determinations can be simultaneously carried out, and, if it is determined that the own vehicle 40 is travelling straight based on results of some determinations, the straight travelling of the own vehicle 40 can be finally determined.

(Modifications)

The own-vehicle acceleration obtainer 15 of each of the cruise-assist ECUs 10 and 10A can obtain the own-vehicle acceleration αs based on a value measured by the accelerator sensor (see FIG. 4) installed in the own vehicle 40 in place of differentiating the own-vehicle speed Vs over time.

Each of the cruise-assist ECUs 10 and 10A can determine whether the own vehicle 40 is accelerating in accordance with an increase or decrease of the own-vehicle speed Vs in place of the own-vehicle acceleration α in step S103. In addition, each of the cruise-assist ECUs 10 and 10A can determine whether the own vehicle 40 is accelerating in accordance with at least one of a driver's accelerator operation or a driver's brake operation.

For example, each of the cruise-assist ECUs 10 and 10A can determine that the own vehicle 40 is accelerating when the accelerator is operated, or that the own vehicle 49 is not accelerating when the brake is operated.

Different values of the reference timing for the activation timing to a safety device can be set for the respective types of a recognized object. Each of the cruise-assist ECUs 10 and 10A can set, for each of the types of a recognized object, the deviation of at least one of the first timing and the second timing from the reference timing in at least one of steps S108 and S110.

In step S108, each of the cruise-assist ECUs 10 and 10A can variably set the first timing in accordance with at least one of the own-vehicle speed Vs, the own-vehicle acceleration αs, the relative speed Vr, and the relative acceleration αr when setting the activation timing to the first timing. For example, if the relative speed Vr has a large value in the approaching direction between the own vehicle 40 and a recognized object, there is a high probability of a collision being unavoidable in spite of a driver's brake operation, resulting in great damage due to the collision. For this reason, the first timing can be set to a larger value, making it possible to activate the corresponding safety device earlier.

Each of the cruise-assist ECUs 10 and 10A can perform activation of a safety device only for the fusion state in which the same object, i.e. the fusion-based object, is detected by both the radar device 21 and the image device 22. This reduces unnecessary activation of the safety device for actually non-existent objects. In step S108, each of the cruise-assist ECUs 10 and 10A can set the activation timing to the first timing only for the preceding object in the fusion state, and can perform the operations in steps S104 and S105 to set the activation timing to the reference timing for another preceding object.

Each of the cruise-assist. ECUs 10 and 10A according to the first to third embodiments is configured to avoid collision of the own vehicle 40 with an object located ahead of the own vehicle 40, but can be applied to a system in which the corresponding ECU is configured to detect an object located at the rear of the own vehicle 40, and avoid collision of the own vehicle 40 with the detected object. Note that the expression "ahead of the own vehicle 40 in the travelling direction" means the forward direction of the own vehicle 40 when the own vehicle 40 is moving forward, but means the rearward direction of the own vehicle 40 when the own vehicle 40 is moving rearward.

Each of the first to third embodiments is configured such that a driver drives the own vehicle 40, but can be configured such that the own vehicle 40 is automatically driven. In this modification, the activation determiner 19 and the control processor 20 can be configured to activate the automatic brake function of the brake device 32 without activating the warning device 31 and the brake-assist function of the brake 32.

Each of the first to third embodiments uses the warning device 31 and the brake device 32 as safety devices, but the safety devices are not limited to these devices.

This application is based on and claims the benefit of priority from Japanese Patent Application 2015-101310, the disclosure of which is incorporated in its entirety herein by reference.

REFERENCE SIGNS LIST

10 . . . Cruise-assist ECU
12 . . . Object information obtainer
13 . . . Object type determiner
14 . . . Own-vehicle speed obtainer
15 . . . Own-vehicle acceleration obtainer
16 . . . Acceleration condition determiner
17 . . . Collision prediction time calculator
18 . . . Activation timing setter
31 . . . Warning device
32 . . . Brake device
40 . . . Vehicle
45 . . . Straight travel determiner

The invention claimed is:

1. A vehicle control apparatus for activating, as a safety device, a device to mitigate collision damage or avoid collision between an own vehicle and an object located ahead in a travelling direction of the own vehicle in accordance with a probability of the own vehicle and the object, the vehicle control apparatus comprising:
   an obtainer configured to obtain a relative distance between the own vehicle and the object, a relative speed between the own vehicle and the object, and a relative acceleration between the own vehicle and the object;
   an acceleration condition determiner configured to determine whether the own vehicle is accelerating;
   a preceding object determiner configured to determine whether the object is a preceding object moving in the same direction of the own vehicle;
   an own-vehicle speed obtainer configured to obtain an own-vehicle speed indicative of a speed of the own vehicle;
   an own-vehicle acceleration obtainer configured to obtain an own-vehicle acceleration indicative of an acceleration of the own vehicle;
   a collision prediction time calculator configured to calculate a collision prediction time that represents a time until which the own vehicle is predicted to collide with the object; and
   a timing setter configured to set an activation timing to be compared with the collision prediction time for determining whether to activate the safety device,
   wherein:
   when it is determined by the acceleration condition determiner that the own vehicle is accelerating, the collision prediction time calculator is configured to calculate the collision prediction time in accordance with the relative speed and the relative distance, and the timing setter is configured to set the activation timing to a reference timing;

when it is determined by the acceleration condition determiner that the own vehicle is not accelerating, and by the preceding object determiner that the object is not a preceding object, the collision prediction time calculator is configured to calculate the collision prediction time in accordance with the relative speed, the relative acceleration, and the relative distance, and the timing setter is configured to set the activation timing to be larger than the reference timing; and when it is determined by the acceleration condition determiner that the own vehicle is not accelerating, by the preceding object determiner that the object is a preceding object, and that the own-vehicle speed is lower than a predetermined value, the collision prediction time calculator is configured to calculate the collision prediction time in accordance with the relative speed, the own-vehicle acceleration, and the relative distance, and the timing setter is configured to set the activation timing to be smaller than the reference timing.

2. The vehicle control apparatus according to claim 1, wherein, when it is determined by the acceleration condition determiner that the own vehicle is not accelerating, by the preceding object determiner that the object is a preceding object, and that the own-vehicle speed is higher than the predetermined value, the collision prediction time calculator is configured to calculate the collision prediction time in accordance with the relative speed, the relative acceleration, and the relative distance, and the timing setter is configured to set the activation timing to a value larger than the reference timing.

3. The vehicle control apparatus according to claim 1, wherein:

when it is determined by the acceleration condition determiner that the own vehicle is not accelerating, and by the preceding object determiner that the object is not a preceding object, the collision prediction time calculator is configured to calculate the collision prediction time in accordance with the own-vehicle acceleration, and the timing setter is configured to set the activation timing to a value smaller than the reference timing.

4. The vehicle control apparatus according to claim 1, further comprising:

a straight travel determiner configured to determine whether the own vehicle is travelling straight; and a safety device activator configured to, when it is determined by the straight travel determiner that the own vehicle is travelling straight, activate the safety device upon the collision prediction time becoming equal to or smaller than the activation timing.

5. A vehicle control method of activating, as a safety device, a device to mitigate collision damage or avoid collision between an own vehicle and an object located ahead in a travelling direction of the own vehicle in accordance with a probability of the own vehicle and the object, the vehicle control method comprising:

an obtaining step of obtaining a relative distance between the own vehicle and the object, a relative speed between the own vehicle and the object, and a relative acceleration between the own vehicle and the object;

an acceleration condition determining step of determining whether the own vehicle is accelerating;

an own-vehicle speed obtaining step of obtaining an own-vehicle speed indicative of a speed of the own vehicle;

an own-vehicle acceleration obtaining step of obtaining an own-vehicle acceleration indicative of an acceleration of the own vehicle;

a preceding object determining step of determining whether the object is a preceding object moving in the same direction of the own vehicle;

a calculating step of calculating a collision prediction time that represents a time until which the own vehicle is predicted to collide with the object; and a timing setting step of setting an activation timing to be compared with the collision prediction time for determining whether to activate the safety device, wherein:

when it is determined by the acceleration condition determining step that the own vehicle is accelerating, the calculating step is configured to calculate the collision prediction time in accordance with the relative speed and the relative distance, and the timing setting step is configured to set the activation timing to a reference timing;

when it is determined by the acceleration condition determining step that the own vehicle is not accelerating, and by the preceding object determining step that the object is not a preceding object, the calculating step is configured to calculate the collision prediction tune in accordance with the relative speed, the relative acceleration, and the relative distance, and the timing setting step is configured to set the activation timing to be larger than the reference timing; and when it is determined by the acceleration condition determining step that the own vehicle is not accelerating, by the preceding object determining step that the object is a preceding object, and that the own-vehicle speed is lower than a predetermined value, the calculating step is configured to calculate the collision prediction time in accordance with the relative speed, the own-vehicle acceleration, and the relative distance, and the timing setting step is configured to set the activation timing to be smaller than the reference timing.

* * * * *